(12) United States Patent
Chaubard et al.

(10) Patent No.: US 11,847,543 B2
(45) Date of Patent: *Dec. 19, 2023

(54) AUTOMATIC LABELING OF PRODUCTS VIA EXPEDITED CHECKOUT SYSTEM

(71) Applicant: Focal Systems, Inc., Burlingame, CA (US)

(72) Inventors: Francois Chaubard, Millbrae, CA (US); Adriano Quiroga Garafulic, Sao Paulo (BR)

(73) Assignee: FOCAL SYSTEMS, INC., Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,234

(22) Filed: Nov. 17, 2022

(65) Prior Publication Data

US 2023/0081912 A1   Mar. 16, 2023

Related U.S. Application Data

(63) Continuation of application No. 17/191,654, filed on Mar. 3, 2021, now Pat. No. 11,544,506, which is a (Continued)

(51) Int. Cl.
| | |
|---|---|
| *G06K 9/00* | (2022.01) |
| *G06N 20/00* | (2019.01) |
| *A47F 9/04* | (2006.01) |
| *G06T 7/11* | (2017.01) |
| *G06F 15/76* | (2006.01) |

(Continued)

(52) U.S. Cl.
CPC ............ *G06N 20/00* (2019.01); *A47F 9/048* (2013.01); *G06F 15/76* (2013.01); *G06F 18/214* (2023.01);
(Continued)

(58) Field of Classification Search
CPC .... G06Q 20/208; G06Q 10/087; G06Q 30/00; G06Q 20/322; G06Q 30/0633;
(Continued)

(56) References Cited

U.S. PATENT DOCUMENTS

| | | |
|---|---|---|
| 5,821,512 A | 10/1998 | O'Hagan et al. |
| 6,434,530 B1 | 8/2002 | Sloane et al. |
| | (Continued) | |

FOREIGN PATENT DOCUMENTS

| | | |
|---|---|---|
| CN | 202806824 U | 3/2013 |
| CN | 202896621 U | 4/2013 |
| | (Continued) | |

OTHER PUBLICATIONS

PCT International Search Report and Written Opinion, PCT Application No. PCT/US18/16317, dated Apr. 19, 2018, 17 pages.
(Continued)

*Primary Examiner* — Alex Kok S Liew
(74) *Attorney, Agent, or Firm* — FENWICK & WEST LLP

(57) ABSTRACT

A portable checkout unit automatically generates training data for an automatic checkout system as a customer collects items in a store. A customer uses an item scanner of portable checkout unit to generate a virtual shopping list of items collected in the shopping cart. When the customer adds a new item to the shopping cart or on some regular interval, the portable checkout unit captures images of the items contained by the shopping cart and can generate bounding boxes for each product in each image. The bounding boxes can be associated with item identifiers from previously-generated bounding boxes to identify the items captured by the bounding boxes. Each bounding box paired with an item identifier can then be used as training data for an automated checkout system.

20 Claims, 3 Drawing Sheets

Related U.S. Application Data continuation of application No. 15/979,400, filed on May 14, 2018, now Pat. No. 10,963,740.

(60) Provisional application No. 62/505,776, filed on May 12, 2017.

(51) Int. Cl.
  *G06Q 30/06* (2023.01)
  *G06V 20/20* (2022.01)
  *G06F 18/214* (2023.01)
  *G06V 10/774* (2022.01)

(52) U.S. Cl.
  CPC ......... *G06F 18/2155* (2023.01); *G06Q 30/06* (2013.01); *G06T 7/11* (2017.01); *G06V 10/774* (2022.01); *G06V 20/20* (2022.01)

(58) Field of Classification Search
  CPC ........ G06Q 30/06; G06Q 20/20; G06Q 30/02; G06Q 20/12; G06Q 20/385; G06Q 30/0631; G06Q 20/3274; G06Q 20/3821; G06Q 20/42; G06Q 30/0601; G06Q 30/0637; G06Q 10/08; G06K 9/78; G06K 5/00; G06K 9/00771; G06K 9/209; G06K 7/10861; G06K 7/1456; G06K 9/46; G06K 9/6201; G06K 2209/17; G06K 9/00664; G06K 9/00221; G06K 9/00288; G06K 9/18; G06K 2009/00328
  See application file for complete search history.

(56) References Cited

U.S. PATENT DOCUMENTS

| | | |
|---|---|---|
| 9,443,314 B1 | 9/2016 | Huang et al. |
| 2006/0208072 A1 | 9/2006 | Ku et al. |
| 2006/0219780 A1 | 10/2006 | Swartz et al. |
| 2007/0284440 A1 | 12/2007 | Birmingham et al. |
| 2008/0011836 A1* | 1/2008 | Adema ................. G06Q 30/00 235/383 |
| 2008/0230603 A1 | 9/2008 | Stawar et al. |
| 2010/0096450 A1 | 4/2010 | Silverbrook et al. |
| 2012/0284132 A1* | 11/2012 | Kim ...................... G06Q 20/18 235/375 |
| 2013/0044914 A1* | 2/2013 | Rai ...................... G06V 10/245 382/103 |
| 2014/0079321 A1 | 3/2014 | Huynh-Thu et al. |
| 2014/0164176 A1 | 6/2014 | Kitlyar |
| 2014/0176727 A1 | 6/2014 | Saptharishi et al. |
| 2014/0207590 A1 | 7/2014 | Bouaziz et al. |
| 2015/0025969 A1 | 1/2015 | Schroll et al. |
| 2015/0039458 A1 | 2/2015 | Reid |
| 2017/0278308 A1* | 9/2017 | Bleiweiss .............. G06V 10/17 |
| 2019/0057435 A1 | 2/2019 | Chomley et al. |

FOREIGN PATENT DOCUMENTS

| | | |
|---|---|---|
| CN | 203142736 U | 8/2013 |
| EP | 2381409 A2 | 10/2011 |
| WO | WO 2005/096237 A1 | 10/2005 |
| WO | WO 2016/135142 A1 | 9/2016 |
| WO | WO 2018/002864 A2 | 1/2018 |

OTHER PUBLICATIONS

PCT International Search Report and Written Opinion, PCT Application No. PCT/US2017/030429, dated Jul. 19, 2017, 15 pages.
PCT International Search Report and Written Opinion, PCT Application No. PCT/US18/32610, dated Aug. 24, 2018, 17 pages.
United States Office Action, U.S. Appl. No. 15/979,400, dated Jun. 15, 2020, 11 pages.

\* cited by examiner

AUTOMATIC LABELING OF PRODUCTS VIA EXPEDITED CHECKOUT SYSTEM

CROSS REFERENCE TO RELATED APPLICATION

This application is a continuation of U.S. application Ser. No. 17/191,654, entitled "Automatic Labeling of Products Via Expedited Checkout System" and filed on Mar. 3, 2021, which is a continuation of U.S. patent application Ser. No. 15/979,400 (now U.S. Pat. No. 10,963,740), entitled "Automatic Labeling of Product Images and Self-Checkout with Loss Prevention" and filed on May 14, 2018, which claims the benefit of Provisional Patent Application No. 62/505,776, filed on May 12, 2017, which are hereby incorporated by reference in their entirety.

The present disclosure also relates to U.S. patent application Ser. No. 15/587,713, entitled "Expedited Checkout System through Portable Checkout Units" and filed on May 1, 2017, and U.S. patent application Ser. No. 15/885,746, entitled "Automated Checkout System through Mobile Shopping Units" and filed on Jan. 31, 2018, the contents of each of which is hereby incorporated by reference in their entirety.

BACKGROUND

In conventional stores, a customer collects items in a shopping cart or a hand-held basket, and brings the collected items to a cashier. Typically, the cashier must scan a barcode that is printed or placed on each item the customer is purchasing, and a point-of-sale (POS) system determines the total price of the collected items. However, this method for checking out a shopper in a store is inefficient. A cashier must scan each item purchased by every customer who shops at the store. If too many customers want to check out of the store at the same time, a customer may have to wait in line for a long time before a cashier can check out the customer from the store. Some stores parallelize this process by making more than one cashier and POS system available to customers. However, stores must pay cashiers to be available to check out customers, and thus additional cashiers may be prohibitively expensive for stores.

Some stores include automated point-of-sale systems wherein a customer uses the point-of-sale system directly to purchase their items and check out of the store without a cashier. However, these automated POS systems can still be prone to long lines, and the unfamiliar user interfaces can be difficult for a customer to use.

Some stores may use an expedited checkout system, which allows customers to scan products as they place the products in their shopping cart (or shopping basket) to generate a shopping list of products that the customers intend to purchase from the store. The customers can then checkout from the store using an interface on a portable checkout unit or through a point of sale system. However, an expedited checkout system may be inconvenient for customers because customers may still be required to individually scan each product they place into their shopping carts. Stores may alternatively or additionally use automated checkout systems, which identify products that a customer places in their shopping cart using cameras, and/or other sensors, that may be attached to the shopping cart. These automated checkout systems can be very convenient for customers because the list of products in their carts are automatically generated for them. However, automated checkout systems typically rely on machine-learned models that are trained based on numbers of labeled images for each product that could enter the shopping cart. These labeled images can be expensive to generate using conventional methods, which typically require human labelers. Additionally, during operation of an automated checkout system, the cameras attached to the shopping cart may not be able to capture sufficient information in the image to accurately predict a product identifier for each products in the cart. For example, occlusion of products in the shopping cart or a lack of trained data for a specific product or edge case may cause the automated checkout system to be incapable of identifying the product.

SUMMARY

A portable checkout unit of an expedited checkout system can automatically generate training data for an automatic checkout system as a customer collects items and places the items in a shopping cart or a hand-held basket. A customer uses a portable checkout unit to generate a virtual shopping list of items that the customer intends to purchase. A customer scans items using an item scanner of the portable checkout unit. The item scanner determines an item identifier for the item and updates a virtual shopping list that stores item identifiers for items that the customer has collected in the shopping cart. When the customer adds a new item to the shopping cart or on some regular interval, the portable checkout unit captures image data of the new item and previous items that are contained inside the shopping cart (or hand-held basket). The portable checkout may detect an item that is added to the shopping cart using a camera or one or more sensors that detect that a change in inventory has occurred inside the shopping cart. The portable checkout unit uses the image data to identify portions of the images that represent items in the shopping cart based on the item identifiers stored in the virtual shopping list. In some embodiments, the portable checkout unit generates a bounding box around each product in each image, and matches them to previously identified bounding boxes in previously-captured images to track bounding boxes per product per camera. The portable checkout unit can pair each tracked bounding box with the item identifiers stored in the virtual shopping list based on the time at which the product entered the shopping cart and the time at which the product was scanned.

The portable checkout unit generates training data based on the identified portions of the images. In some embodiments, the generated training data includes pairings of bounding boxes with item identifiers. The portable checkout unit may store the generated training data locally or may transmit the generated training data to a store system for storage.

An expedited checkout system can thereby provide the training data necessary to train an automated checkout system for use in the store or in other stores, thereby enabling the effective use of automated checkout systems in more stores. Furthermore, the training data is generated automatically as customers purchase items from a store, thereby reducing the development costs of automated checkout systems.

DETAILED DESCRIPTION

Figure 1:
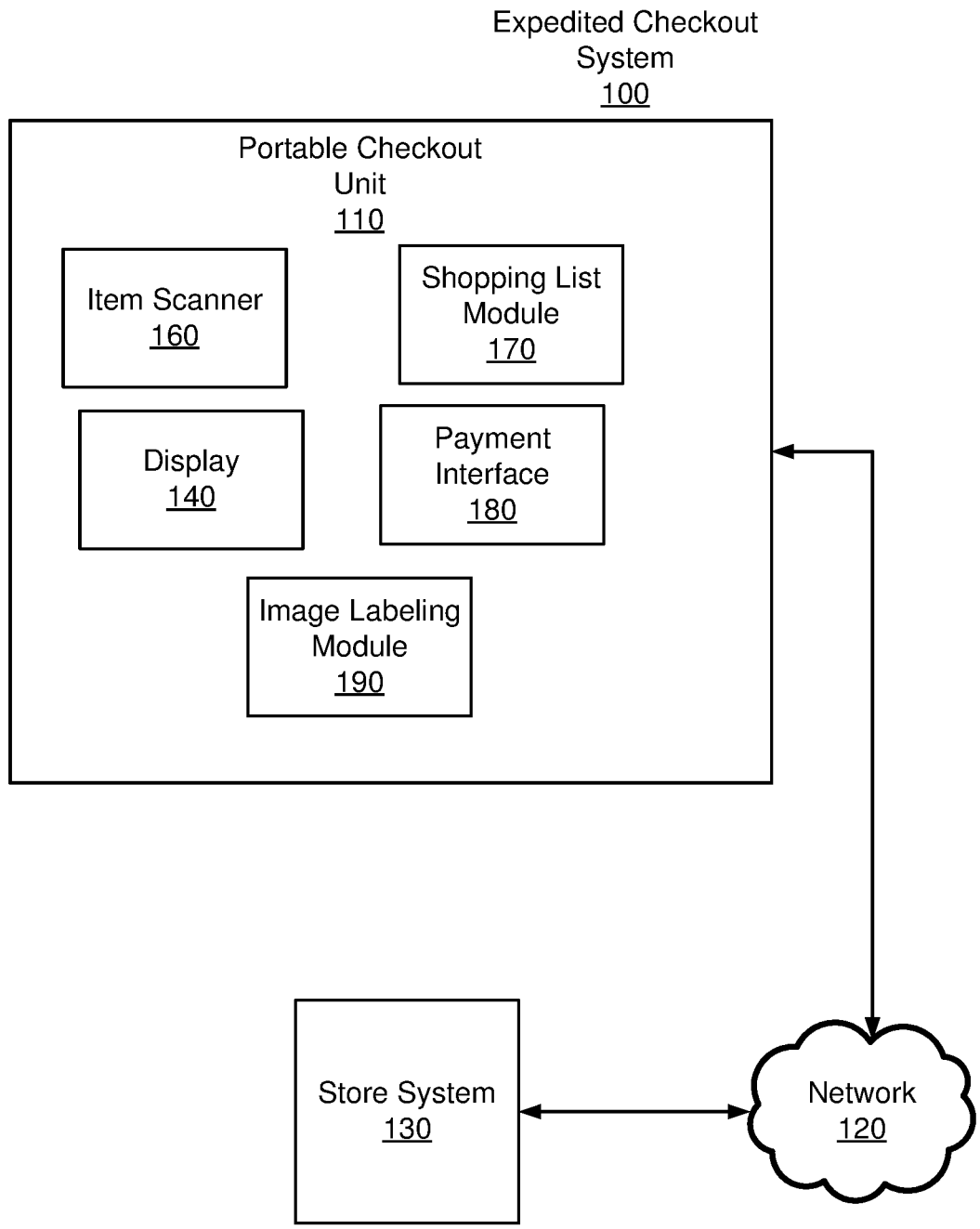
FIG. 1 illustrates an example system environment and architecture for an expedited checkout system, in accordance with some embodiments.

An expedited checkout system allows a customer to generate a virtual shopping list on a client application operating on the customer's mobile device, and expedite checkout from a store using the client application. The expedited checkout system can additionally generate labeled image data for training an automated checkout system. FIG. 1 is a system diagram for an example expedited checkout system 100, in accordance with some embodiments. The expedited checkout system 100 illustrated in FIG. 1 includes a portable checkout unit 110, a network 120, and a store system 130. Alternative embodiments may include more, fewer, or different components from those illustrated in FIG. 1. For example, while a single portable checkout unit 110 is illustrated in FIG. 1, alternate embodiments may include multiple portable checkout units 110. The functionality of each component may be divided between components differently from the description below. For example, some of the functionality of the portable checkout unit 110 may be performed by a mobile device of the customer that is in communication with the portable checkout unit 110. Furthermore, each component may perform their respective functionalities in response to a request from a human, or automatically without human intervention. U.S. patent application Ser. No. 15/587,713 describes an expedited checkout system in further detail.

The portable checkout unit 110 allows a customer to generate a virtual shopping list while the customer collects items within a store. The portable checkout unit 110 is physically attached to a shopping cart or a hand-held basket that is made available by a store that is using the expedited checkout system 100. In some embodiments, the portable checkout unit 110 can be attached to a pre-exiting shopping cart or hand-held basket, e.g. via a bracket, a mount, a strap, screws, bolts, or adhesive. In other embodiments, the portable checkout unit 110 can be manufactured into the cart itself.

The portable checkout unit 110 includes an item scanner 140 that a customer can use to scan items in the store. The item scanner 140 can include a one-dimensional laser barcode scanner, a two-dimensional laser barcode scanner, a camera-based image processing scanner, or a radio-frequency identification (RFID) scanner. The item scanner 140 can scan an item and determine an item identifier associated with the item. The item identifier identifies a type of the item that is scanned by the item scanner. An item type describes a particular product, brand, or category. In some embodiments, the item identifier is a stock keeping unit or a universal product code. The portable checkout unit 110 updates a virtual shopping list for the customer's visit to the store via a shopping list module 150. The virtual shopping list is a list of one or more list elements that describe items that the customer has collected in a shopping cart or a hand-held basket to purchase from the store. Each list element includes an item identifier and a count of items collected by the customer that are associated with the item identifier. If the item scanner 140 determines an item identifier for a scanned item, the shopping list module 150 updates the virtual shopping list to include the item associated with the item identifier. If a list element associated with the received item identifier does not exist yet, the shopping list module 150 generates a new list element and stores the new list element in the virtual shopping list. If the list element already exists, the shopping list module 150 increments the count associated with the list element.

The portable checkout unit 110 presents the virtual shopping list to the customer via a display 160. The virtual shopping list is presented with the list elements stored in the virtual shopping list, and may present the item identifier and item count associated with each list element. Each list element may also be presented with information about the items associated with the list elements, such as the names, descriptions, a picture, pricing information, or nutrition information of each item. The portable checkout unit 110 may receive the item information from an item database stored by the store system 130 via the network 120. To receive the item information from the store system 130, the portable checkout unit 110 may transmit the item identifier to the store system 130 and, in response to receiving the item identifier, the store system 130 may transmit item information associated with the item identifier to the portable checkout unit 110. In some embodiments, some or all of the item database is stored by the portable checkout unit 110. The portable checkout unit 110 may also present advertisements or coupons to the customer that are related to the items in the customer's virtual shopping list. For example, if the customer has bread in their virtual shopping list, the portable checkout unit 110 may present advertisements or coupons for sliced meats or for condiments.

In some embodiments, when the customer is ready to checkout from the store, the customer can select a checkout option presented by the portable checkout unit 110 and, in response, the portable checkout unit 110 initiates the transaction for the customer to check out of the store. In some embodiments, the customer checks out of the store without going to a POS system. For example, the customer may use a payment interface 170 provided by the portable checkout unit 110 to pay for the items in their virtual shopping list. The payment interface 170 may include a magnetic card reader, an EMV reader, or an NFC scanner to receive payment information from the customer. Payment information can include credit card information, debit card information, bank account information, or peer-to-peer payment service information. The portable checkout unit 110 transmits payment information received from the customer to the store system 130 to execute the checkout transaction. If the payment information is valid and the transaction is successful, the portable checkout unit 110 is notified by the store system 130 that the transaction was successful, and presents a notification to the customer with a receipt for the checkout transaction. The portable checkout unit 110 may print a receipt for the customer through a thermal printer, or may provide an option to the customer to be sent an electronic receipt for the transaction (e.g., via email or text message). In some embodiments, an employee of the store confirms that the customer has only the items that the customer has purchased. To prevent the possibility of theft, customer may be required to undergo an audit and present a receipt to an employee of the store to validate the checkout transaction. The receipt may be a printed receipt, an electronic receipt transmitted to the customer, or a receipt stored by the portable checkout unit 110.

In some embodiments, the customer checks out via a POS system. The customer may be required to provide a customer identifier or a shopping list identifier to a cashier operating the POS system. For example, the customer may be required to provide their name, their initials, a customer identification number, an email address, a username, or a shopping list identification number. In some embodiments, the portable checkout unit 110 presents a shopping list identifier to be used to identify the customer's virtual shopping list to the POS system. For example, the portable checkout unit 110 may present a PIN, a one-dimensional barcode, or a two-dimensional barcode that can be used to identify the customer's virtual shopping list. When the POS system receives the shopping list identifier, the POS system retrieves the virtual shopping list from the store system 130. The employee operating the POS system may check the items collected by the customer and ensure that the items are accounted for in the virtual shopping list. The customer uses the POS system to provide payment information for the transaction and can receive a receipt for the transaction from the POS system physically or electronically.

While the portable checkout unit 110 generates and updates a shopping list for the customer, the image labeling module 180 of the portable checkout unit 110 generates labeled training images of the contents of the customer's cart. When the customer scans an image using the portable checkout unit 110, the image labeling module 180 instructs one or more cameras attached to the shopping cart or hand-held basket to capture one or more images of the contents of the shopping cart or hand-held basket. Each camera attached to the shopping cart or hand-held basket may capture a single image or a series of images. In some embodiments, the image labeling module 180 instructs the one or more cameras to capture images of the contents of the shopping cart or hand-held basket when sensors on the shopping cart or hand-held basket detect that the contents of the shopping cart have changed. For example, the image labeling module 180 may instruct the one or more cameras to capture images when some combination of pressure, motion, depth, or RFID sensors on the shopping cart detect a change in the contents of the shopping cart.

Figure 2:
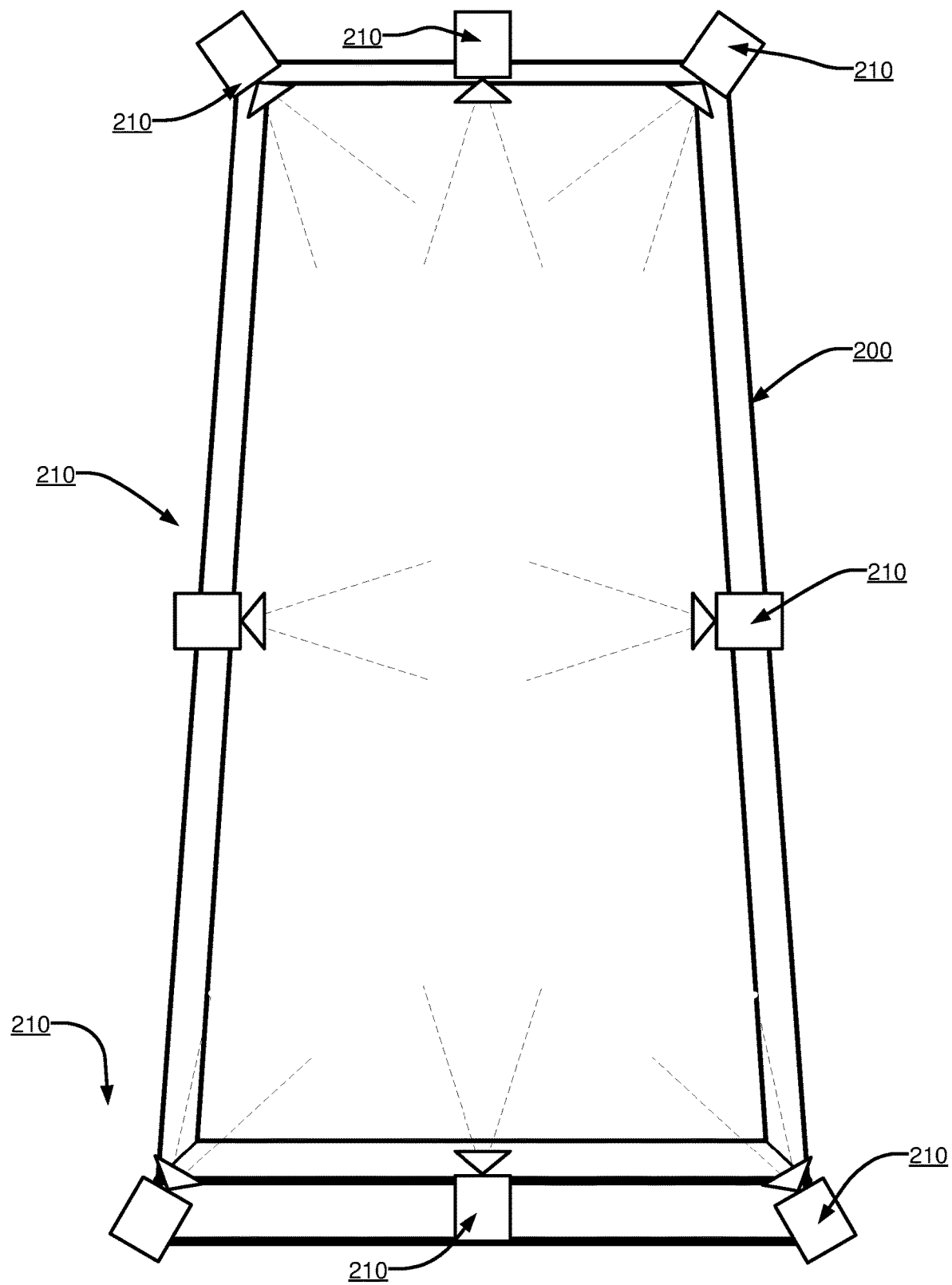
FIG. 2 illustrates example camera positions of cameras attached to a shopping cart, in accordance with some embodiments.

FIG. 2 is a top-down view illustration of example camera positions on a shopping cart 200, in accordance with some embodiments. As explained above, the portable checkout unit 110 can be mounted to a shopping cart, as pictured in FIG. 2, or to a hand-held basket. Cameras 210 are mounted at various positions on the shopping cart 200, which provides a variety of angles at which image data can be collected to identify items that have been added to or removed from the shopping cart 200. Any or all of these example camera positions may be used and the set of camera positions illustrated in FIG. 2 are not an exhaustive set of possible camera positions that may be used by mobile shopping units.

The image labeling module 180 labels the captured images based on virtual shopping list. For example, the image labeling module 180 may label the images with the item identifiers for the items stored in the virtual shopping list. The image labeling module 180 also may generate bounding boxes that identify where in the captured images each item is represented. The bounding boxes may include item identifiers that represent the items captured by the bounding boxes, thereby identifying the items bounded by the bounding boxes. The image labeling module 180 may generate the bounding boxes using a model that generates bounding boxes based on the item identifiers in the virtual shopping list. For example, the image labeling module 180 may use a machine-learned model that generates bounding boxes for items in the shopping cart based on the virtual shopping list. The image labeling module 180 may use additional data from sensors on the shopping cart to generate the bounding boxes. For example, the image labeling module 180 may use pressure sensor data, motion sensor data, depth sensor data, or RFID sensor data to determine where in the shopping cart the item was placed.

In some embodiments, the image labeling module 180 uses the previous positions of bounding boxes to generate new bounding boxes. For example, the image labeling module 180 may determine that an item in the shopping cart did not move when the new item was added to the cart, and thus may determine that the bounding box for the item should be near the location of a previously-determined bounding box for the item. In some embodiments, the image labeling module 180 generates bounding boxes that identify the positions of items within the images captured by the cameras attached to the shopping cart without identifying the item contained by each bounding box. The image labeling module 180—may then pair the generated bounding boxes with previously-generated bounding boxes to identify the items contained by newly-generated bounding boxes. The item identifier for the item contained by the previously-generated bounding boxes may be associated with the newly-generated bounding box that is paired with the previously-generated bounding box. In some embodiments, the bounding boxes are paired using a pairing algorithm such as the Intersection over Union algorithm or the Mutual Information algorithm.

The image labeling module 180 transmits the labeled image data to the store system 140 for storage or use in training an automatic checkout system for use in the store. The image labeling module 180 may also transmit additional training data to store system 130. The additional training data may be captured by sensors attached to the shopping cart. For example, the additional training data may include pressure sensor data, proximity sensor data, motion sensor data, or depth sensor data from sensors attached to the shopping cart.

The portable checkout unit 110 can communicate with the store system 130 via the network 120, which may comprise any combination of local area and wide area networks employing wired or wireless communication links. In some embodiments, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). All or some of the communication links of the network 120 may be encrypted. In some embodiments, the network 120 comprises a network operated by the store that uses the expedited checkout system 100.

The store system 130 comprises one or more computing devices that are operated by a store that uses the expedited checkout system 100. The store system 130 stores a database of item information for items sold by the store. For example, the store system 130 may store item identifiers, item names, item descriptions, item reviews, item pictures, advertisements associated with items, and coupons associated with items. In some embodiments, the store system 130 also stores a copy of virtual shopping lists for customers shopping within the store. The store system 140 may receive the virtual shopping lists from the customers' mobile devices when the virtual shopping lists are updated or when the customer is about to check out of the store. In some embodiments, the store system 130 receives payment information from a POS system at which the customer is checking out to charge the customer for the items in their virtual shopping list.

The store system 130 also receives training data from the portable checkout unit 110 for training an automated checkout system. The training data includes labeled images generated by the portable checkout unit 110 and may also include sensor data captured by sensors attached to the shopping cart. The store system 130 can use the training data to train machine-learned models that are used by an automated checkout system, such as the automated checkout system described in U.S. patent application Ser. No. 15/885, 746. An automated checkout system trained using the training data received from the portable checkout unit can identify items placed in the shopping cart in real time using the cameras attached to the shopping cart. The automated checkout system can generate a virtual shopping list based on items identified in the shopping cart using images from the cameras attached to the shopping cart and any sensor data captured by sensors attached to the shopping cart.

Expedited Store Checkout

Figure 3:
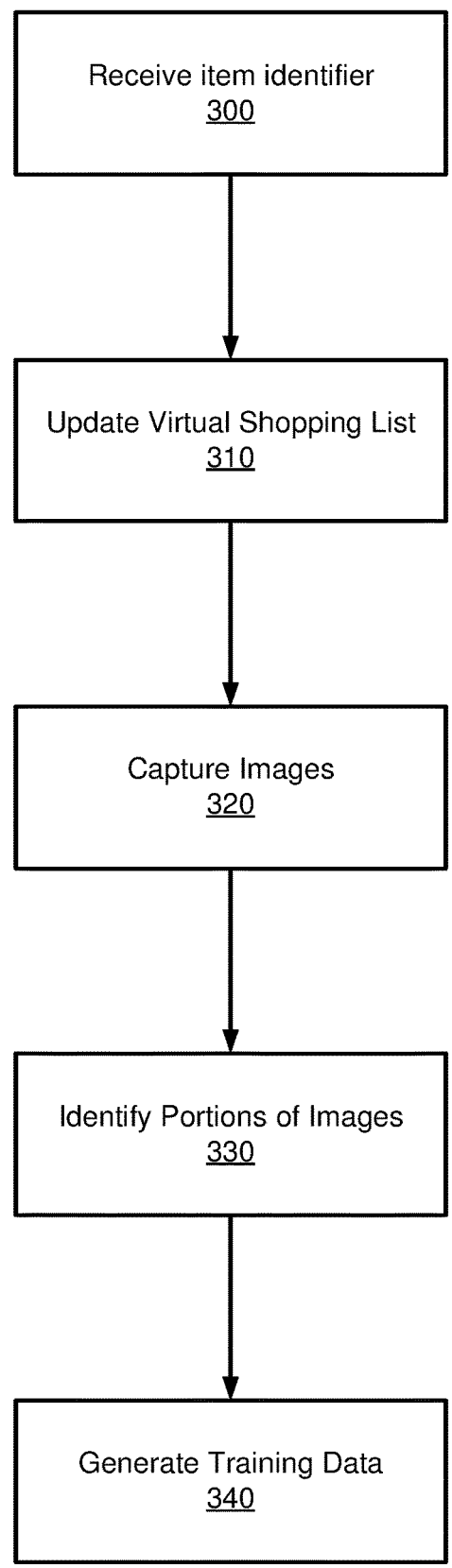
FIG. 3 is a flowchart for a method for generating training data for an automated checkout system via a portable checkout unit, in accordance with some embodiments.

FIG. 3 is a flowchart for a method of generating labeled images via a portable checkout unit, in accordance with some embodiments. Alternate embodiments may include more, fewer, or different steps from those illustrated in FIG. 3, and the steps may be performed in a different order from that illustrated in FIG. 3. Additionally, each of these steps may be performed automatically by the expedited checkout system without human intervention.

The portable checkout unit receives 300 an item identifier for an item collected by a customer as the customer is shopping in a store. The portable checkout unit may receive the item identifier via an item scanner that is integrated into the portable checkout unit. The portable checkout unit updates 310 a virtual shopping list for the customer's trip to the store based on the received item identifier. The virtual shopping list describes items that the customer has scanned using the portable checkout unit and collected in a shopping cart (or a hand-held basket). The virtual shopping list includes a set of item identifiers for the items that the customer has scanned and collected, and can be updated to include the received item identifier when the portable checkout unit receives the item identifier.

When the portable checkout unit receives the item identifier, the portable checkout unit captures 320 one or more images of the contents of the shopping cart. The portable checkout unit captures the one or more images using one or more cameras that are attached to the shopping cart. In some embodiments, the shopping cart includes one or more sensors (e.g., pressure sensors or proximity sensors) that capture sensor data for the contents of the shopping cart. The portable checkout unit may capture images of the shopping cart in response to the one or more sensors determining that a change to the contents of the shopping cart has occurred. For example, the portable checkout unit may capture images of the shopping cart in response to receiving pressure sensor data or proximity sensor data that an item has been added to the shopping cart. The portable checkout unit may use the received item identifier to determine which item was added to the shopping cart by the customer.

The portable checkout unit identifies 330 portions of the captured images that represent the one or more items stored in the shopping cart. The portable checkout unit may use the item identifiers stored in the virtual shopping list to identify the portions of the captured images that represent the items collected in the shopping cart. For example, the portable checkout unit may use a model that can identify portions of an image that represents an item for a given item identifier. The identified portions of the captured images may be designated using bounding boxes that identify portions of the captured images that represent items. Each bounding box may be associated with an item identifier that identifies the item represented by the portion of an image identified by the bounding box. In some embodiments, the portable checkout unit uses sensor data to identify portions of the image that represent items. For example, the portable checkout unit may use pressure sensor data or proximity sensor data to determine where an item was placed within the shopping cart. In some embodiments, the portable checkout unit identifies portions in multiple images that represent a single item in the shopping cart. For example, the portable checkout unit may identify portions of images that represent an item captured from different perspectives.

The portable checkout unit generates 340 training data based on the identified portions of images. The training data may include the identified portions of the images and item identifiers associated with the identified portions that identify the items represented in the portions. In some embodiments, the training data includes labels for the items represented in the portions that are derived based on the item identifiers scanned manually by the shopper that is stored in the customers virtual shopping list. The training data may further include sensor data captured by sensors attached to the shopping cart. The training data may be used by the expedited checkout system to train an automated checkout system to identify items that customers place shopping carts in real time.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    detecting, at a first time, that a first item was added to a first container;
    capturing a first image of the first container comprising the first item;
    applying the first image to a machine-learned model, wherein the machine-learned model was trained to output an item identifier for the first item by:
        responsive to detecting that a second item was added to a second container at a second time prior to the first time:
            capturing a second image using a camera facing the second container, the camera being directed towards a plurality of items contained by the second container including the second item and a third item having a same item identifier as the first item;
            identifying one or more portions of the second image that contains the third item; and
            generating training data that comprises the identified portion of the second image that contains the third item, and a label comprising the item identifier for the first item;
    receiving, as output from the machine-learned model, the item identifier for the first item; and
    updating an accounting of items in the first container to account for the first item based on the received item identifier.

2. The method of claim 1, wherein an item identifier for the second item was determined using an item scanner of a portable checkout unit when the second item was added to the second container.

3. The method of claim 1, further comprising:
    receiving sensor data from one or more sensors attached to the first container.

4. The method of claim 3, wherein the one or more sensors comprise at least one of a pressure sensor, a proximity sensor, a motion sensor, a depth sensor, or an RFID sensor.

5. The method of claim 3, wherein the generated training data further comprises the received sensor data.

6. The method of claim 3, further comprising:
    detecting that the second item was added to the cart container based on the received sensor data.

7. The method of claim 1, wherein each of the one or more portions comprises a bounding box.

8. The method of claim 7, wherein each bounding box for the one or more portions is generated based on previously-generated bounding boxes.

9. The method of claim 8, wherein each bounding box for the one or more portions is paired with a previously-generated bounding box, and wherein each bounding box for the one or more portions is associated with an item identifier associated with the previously-generated bounding box associated with the bounding box.

10. A non-transitory computer-readable medium comprising memory with instructions encoded thereon, the instructions, when executed by one or more processors, causing the one or more processors to perform operations, the instructions comprising instructions to:
    detect, at a first time, that a first item was added to a first container;
    capture a first image of the first container comprising the first item;
    apply the first image to a machine-learned model, wherein the machine-learned model was trained to output an item identifier for the first item by:
        responsive to detecting that a second item was added to a second container at a second time prior to the first time:
            capturing a second image using a camera facing the second container, the camera being directed towards a plurality of items contained by the second container including the second item and a third item having a same item identifier as the first item;
            identifying one or more portions of the second image that contains the third item; and
            generating training data that comprises the identified portion of the second image that contains the third item, and a label comprising the item identifier for the first item;
    receive, as output from the machine-learned model, the item identifier for the first item; and
    update an accounting of items in the first container to account for the first item based on the received item identifier.

11. The non-transitory computer-readable medium of claim 10, wherein an item identifier for the second item was determined using an item scanner of a portable checkout unit when the second item was added to the second container.

12. The non-transitory computer-readable medium of claim 10, the instructions further comprising instructions to receive sensor data from one or more sensors attached to the first container.

13. The non-transitory computer-readable medium of claim 12, wherein the one or more sensors comprise at least one of a pressure sensor, a proximity sensor, a motion sensor, a depth sensor, or an RFID sensor.

14. The non-transitory computer-readable medium of claim 12, wherein the generated training data further comprises the received sensor data.

15. The non-transitory computer-readable medium of claim 12, the instructions further comprising instructions to detect that the second item was added to the second container based on the received sensor data.

16. The non-transitory computer-readable medium of claim 10, wherein each of the one or more portions comprises a bounding box.

17. The non-transitory computer-readable medium of claim 16, wherein each bounding box for the one or more portions is generated based on previously-generated bounding boxes.

18. The non-transitory computer-readable medium of claim 17, wherein each bounding box for the one or more portions is paired with a previously-generated bounding box, and wherein each bounding box for the one or more portions is associated with an item identifier associated with the previously-generated bounding box associated with the bounding box.

19. A system comprising:
memory with instructions encoded thereon; and
one or more processors that, when executing the instructions, are caused to perform operations comprising:
detecting, at a first time, that a first item was added to a first container;
capturing a first image of the first container comprising the first item;
applying the first image to a machine-learned model, wherein the machine-learned model was trained to output an item identifier for the first item by:
responsive to detecting that a second item was added to a second container at a second time prior to the first time:
capturing a second image using a camera facing the second container, the camera being directed towards a plurality of items contained by the second container including the second item and a third item having a same item identifier as the first item;
identifying one or more portions of the second image that contains the third item; and
generating training data that comprises the identified portion of the second image that contains the third item, and a label comprising the item identifier for the first item;
receiving, as output from the machine-learned model, the item identifier for the first item; and
updating an accounting of items in the first container to account for the first item based on the received item identifier.

20. The system of claim 19, wherein an item identifier for the second item was determined using an item scanner of a portable checkout unit when the second item was added to the second container.

* * * * *

UNITED STATES PATENT AND TRADEMARK OFFICE
CERTIFICATE OF CORRECTION

PATENT NO. : 11,847,543 B2
APPLICATION NO. : 17/989234
DATED : December 19, 2023
INVENTOR(S) : Chaubard et al.

It is certified that error appears in the above-identified patent and that said Letters Patent is hereby corrected as shown below:

In the Claims

In Column 10, in Claim 6, Line 4, delete "cart" and insert -- second --, therefor.

Signed and Sealed this
Twenty-first Day of May, 2024

Katherine Kelly Vidal
Director of the United States Patent and Trademark Office